(No Model.)
A. PRAWATKE.
DRIVING GEAR FOR LOCOMOTIVES.
No. 526,981. Patented Oct. 2, 1894.
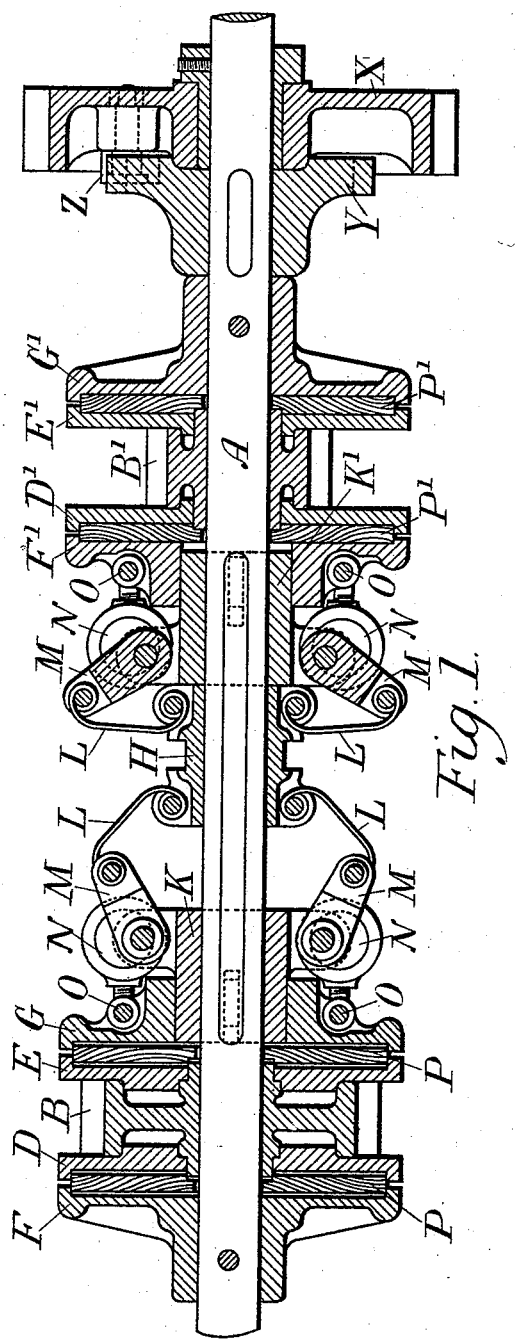
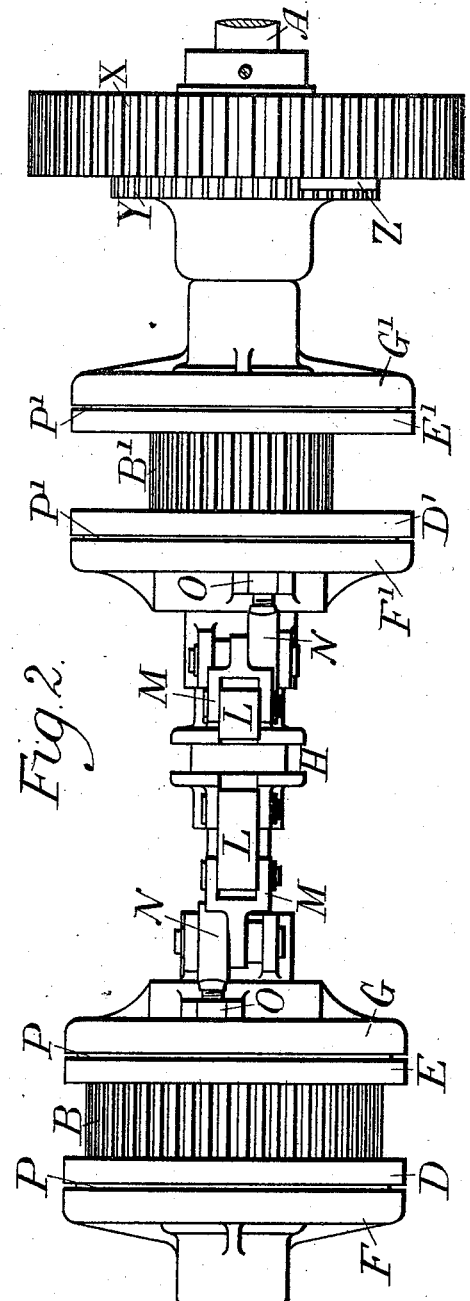
Witnesses:
G. W. Rea,
Thos. A. Green
Inventor:
August Prawatke,
By James L. Norris
Atty.

UNITED STATES PATENT OFFICE.

AUGUST PRAWATKE, OF DRESDEN, GERMANY, ASSIGNOR TO THE GAS TRACTION COMPANY, LIMITED, OF LONDON, ENGLAND.

DRIVING-GEAR FOR LOCOMOTIVES.

SPECIFICATION forming part of Letters Patent No. 526,981, dated October 2, 1894.

Application filed May 24, 1894. Serial No. 512,336. (No model.) Patented in France March 24, 1894, No. 237,318, and in Belgium April 25, 1894, No. 109,676.

*To all whom it may concern:*

Be it known that I, AUGUST PRAWATKE, a subject of the Emperor of Germany, residing at 53 Bergstrasse, Dresden, Saxony, in the German Empire, have invented certain new and useful Driving-Gear for Gas or Oil Motor Locomotives, (for which I have obtained Letters Patent in France, dated March 24, 1894, No. 237,318, and in Belgium, dated April 25, 1894, No. 109,676,) of which the following is a specification.

When a gas or oil motor engine is employed to drive a car, it is desirable to have ready means of altering the speed of the car axles without correspondingly altering the speed of the engine.

This invention relates to gear suitable to be used for such purposes, as I shall describe referring to the accompanying drawings.

Figure 1 is a longitudinal section and Fig. 2 is a plan of a shaft arranged according to this invention for driving at two different speeds or for stopping the vehicle while the motor engine continues to revolve at or about constant speed.

A countershaft A driven from the motor engine through a toothed wheel X and ratchet wheel Y acted on by a pawl Z has fixed on it two disks F and G', and has fitted to slide on sleeves K K' upon it provided with keys so as to turn with it, two other disks G and F', and also a sleeve H.

Between the disks F and G is a toothed wheel B loose on the shaft A but having fixed to its sides disks D and E. In like manner between the disks F' and G' is a toothed wheel B' of less diameter than B also loose on the shaft A but having fixed to its sides disks D' and E'.

Between the pair of disks F and D, the pair E and G, the pairs F' and D', the pair E' and G', are friction disks P P' of wood or equivalent material.

The sliding sleeve H which can be moved to and fro along the shaft A by a suitable lever is connected by links L to arms M upon the spindles of eccentrics N the straps of which are connected by links O to the sliding disks G and F' respectively.

When the sleeve H is in the position shown the disks D' E' F' and G' and the friction disks P P' are pressed together and the wheel B' between them is frictionally driven by them. From this wheel motion is transmitted to the driving wheels of the vehicle by any convenient gearing, the wheel B being in this case ineffective, as it turns freely on the shaft A. When the sleeve H is moved to the left to a middle position, both the wheels B' and B are free so that while A continues to revolve, no motion is communicated to the wheels of the vehicle; but when the sleeve H is moved fully over to the left the wheel B becomes frictionally engaged with the shaft A and motion at increased speed is communicated to the wheels of the vehicle. Should the vehicle tend to run faster than it would be driven by the gearing above described, the ratchet and pawl Y Z permit it to do so.

Obviously instead of employing toothed wheels such as B and B' to communicate motion by toothed gear to the driving axles of the vehicle, sprocket wheels or pulleys might be employed communicating motion by chains or belts.

Having thus described the nature of my invention and the best means I know for carrying the same into practical effect, I claim—

The combination of the rotary shaft A, the gears B and B' of different diameters and loose on said shaft, the disks D, E, and D', E', fixed to the opposite sides of said gears, the disks F and G' fixed to the shaft A at the outer sides of the disks D and E', the sleeves K, K', keyed to the shaft A at the inner sides of the disks E, D', and fitted to slide on and turn with said shaft, the disks G and F' carried on the sleeves K, K', the friction disks P, P, and P', P' located between the pairs of disks F, D, E, G, and F' D', E' G', the sleeve H loose on the shaft A intermediate the sleeves K K', eccentrics N, N, mounted on the sleeves K, K' and having their spindles provided with arms M, M, links O, O, connecting the straps of said eccentrics to the sliding disks G and F', and links L, L, connecting the eccentric arms M, M, with the intermediate sliding sleeve H, substantially as and for the purpose shown and described.

In testimony whereof I have signed my name to this specification, in the presence of two subscribing witnesses, this 9th day of May, A. D. 1894.

AUGUST PRAWATKE.

Witnesses:
   JOHN YOUNG,
      *Zahnsgasse, 22, Dresden.*
   OSCAR SCHWAB,
      *Reichsstr., 38, Dresden.*